US009595012B2

(12) United States Patent
Predale et al.

(10) Patent No.: US 9,595,012 B2
(45) Date of Patent: Mar. 14, 2017

(54) METHOD FOR IMPROVING THE ENVIRONMENTAL IMPACT OF FORMULATED PRODUCTS

(75) Inventors: Robert A. Predale, Plainsboro, NJ (US); Raymond Sharples, Basking Ridge, NJ (US); Jennifer Saxe, Stow, MA (US)

(73) Assignee: Johnson & Johnson Consumer Inc., Skillman, NJ (US)

( * ) Notice: Subject to any disclaimer, the term of this patent is extended or adjusted under 35 U.S.C. 154(b) by 1755 days.

(21) Appl. No.: 12/754,682

(22) Filed: Apr. 6, 2010

(65) Prior Publication Data

US 2011/0246397 A1 Oct. 6, 2011

(51) Int. Cl.
G06Q 10/06 (2012.01)
G06Q 99/00 (2006.01)

(52) U.S. Cl.
CPC ............ *G06Q 10/06* (2013.01); *G06Q 99/00* (2013.01)

(58) Field of Classification Search
USPC ........................................................ 705/1.1
See application file for complete search history.

(56) References Cited

U.S. PATENT DOCUMENTS

| 5,311,437 A | 5/1994 | Leal |
| 5,532,928 A | 7/1996 | Stanczyk |
| 5,652,708 A | 7/1997 | Miyamoto |

(Continued)

OTHER PUBLICATIONS

Environment Canada (EC). 2006. "Exiting Substances Evaluation: Categorization of the Domestic Substances List (DSL)." Internet content available (Oct. 11, 2009) at: http://www.ec.gc.ca/substances/ese/eng/dsl/cat_criteria_process.cfm (Continued)

*Primary Examiner* — Jan P Mincarelli

(57) ABSTRACT

Disclosed are methods for developing a product having a relatively benign environmental impact. The methods evaluate the environmental hazard of various chemical components in formulated products and identify improvements in environmental safety based on those evaluations. Environmental criteria are in part developed based on three factors including; persistence, bioaccumulation and toxicity. One method includes obtaining a preliminary formula for a product, wherein the preliminary formula includes a plurality of chemical components, identifying at least one different chemical component that is capable of being substituted for the chemical component in the preliminary formulation and determining an environmental performance score for the chemical component and the different chemical component and determining an environmental performance score of the preliminary formula and a second formula, wherein the second formula utilizes the different chemical component. The formula having the highest environmental performance score is selected as the product. A second method includes tracking the use of chemical components in an existing product portfolio offered or sold by a business unit or a company, in which existing products having the lowest environmental performance scores would be targeted for replacement by reformulated products having higher environmental scores in order to improve the environmental performance of the business unit or company.

8 Claims, 3 Drawing Sheets

(56) References Cited

U.S. PATENT DOCUMENTS

| | | | |
|---|---|---|---|
| 5,664,112 A | 9/1997 | Sturgeon | |
| 5,712,990 A | 1/1998 | Henderson | |
| 5,726,884 A | 3/1998 | Sturgeon | |
| 5,852,560 A | 12/1998 | Takeyama | |
| 5,864,483 A | 1/1999 | Brichta | |
| 5,878,433 A | 3/1999 | Miyamoto | |
| 5,933,765 A | 8/1999 | Newton | |
| 6,073,055 A | 6/2000 | Jahn | |
| 6,097,995 A | 8/2000 | Tipton | |
| 6,122,622 A | 9/2000 | Wiitala | |
| 6,163,732 A | 12/2000 | Petke | |
| 6,272,390 B1 | 8/2001 | Skovgaard | |
| 6,280,519 B1 | 8/2001 | Yezrielev | |
| 6,311,134 B1 | 10/2001 | Sorenson | |
| 6,330,487 B1 | 12/2001 | Jahn | |
| 6,341,287 B1 | 1/2002 | Sziklai | |
| 6,397,115 B1 | 5/2002 | Basden | |
| 6,408,227 B1 | 6/2002 | Singhvi | |
| 6,816,792 B2 | 11/2004 | Sakurai | |
| 6,973,362 B2 * | 12/2005 | Long et al. | 700/107 |
| 7,096,084 B2 * | 8/2006 | Long et al. | 700/107 |
| 2002/0010524 A1 | 1/2002 | Jin | |
| 2002/0065581 A1 | 5/2002 | Fasca | |
| 2004/0001794 A1 * | 1/2004 | Withiam et al. | 424/65 |

OTHER PUBLICATIONS

European Commission (EU Comm). 2001. "Correction Directive 2001/59/EC of Aug. 6, 2001 adapting to technical progress for the 28th time Council Directive 67/548/EEC on the approximation of the laws, regulations and administrative provisions relating to the classification, packaging and labelling of dangerous substances."

European Chemicals Bureau (ECB). 2003. "Technical Guidance Document in support of Commision Directive 93/67/EEC on Risk Assessment for new notified substances, Commission Regulation (EC) No. 1488/94 on Risk Assessment for existing substances. Direction 98/8/EC of the European Parliament and of the Council concerning the placing of biocidal products on the market. Part II."

Gouin, T; Bocking, S; Mackay, D. 2005. "Policy by analogy: precautionary principle, science and polybrominated diphenyl ethers" *Int. J. Global Environmental Issues*, 5(1/2); 54-67.

OECD. 2006. "OECD Guidelines for the Testing of Chemicals. Revised Introduction to the OECD Guidelines for Testing of Chemicals, Section 3" Internet content available (Oct. 10, 2009) at: http://titania.sourceoecd.org/rpsv/periodical/p15_about.htm?jnlissn=1607310x.

United Nations (UN). 2007. "Globally Harmonized System of Classification and Labelling of Chemicals (GHS) Second revised edition." Internet content available (Oct. 11, 2009) at: http://www.unece.org/trans/danger/publi/ghs_rev02/02files_e.html.

Unites States Environmental Protection Agency (US EPA). 1999a, "Category for Persistent, Bioaccumulative, and Toxic New Chemical Substances." Federal Register. 64(213):60194-60204.

An Aug. 2002 web site ad entitled Consumer, Industrial and/or Institutional Cleaning Products:, describing the Environmental Choice Program. Apparent reprint of R.P. Sandique, "Rating System for 2,000 Industries in Manila Set", Manila Standard, Dec. 9, 1996.

M.B. Swanson et al., "Chemical Ranking and Scoring", Proceedings of the Pellston Workshop on Chemical Ranking and Scoring (1995).

Chemical use Clusters Scoring Methodology, U.S. Environmental Protection Agency (1993). B. Quinn, "Creating a New Generation of environmental Management", Pollution Engineering (1997).

Murarka et al., "Review of the Use Cluster Scoring System: A Risk Screening Method for Groups of Commercial Chemicals by Use", Science Advisory Board (SAB) Report (1996).

* cited by examiner

METHOD FOR IMPROVING THE ENVIRONMENTAL IMPACT OF FORMULATED PRODUCTS

FIELD OF THE INVENTION

The present invention relates to methods for producing formulated products with reduced environmental impact and is particularly useful in formulating consumer products such as health and beauty products such as shampoos, conditioners, skin care compositions and the like by providing a new process to guide product developers in the selection of environmentally preferred ingredients.

BACKGROUND OF THE INVENTION

There has been increasing desire for products that are environmentally friendly. To insure that products can be sold and distributed on a global basis, manufacturers must take into account a wide variety of environmental legal requirements. Several different techniques have been developed for evaluating environmental issues that may arise when formulating products. In one approach there has been developed a "grading system" of suppliers as it relates to their environmental practices. The environmental history of raw material suppliers and their current environmental procedures are taken into account by various agencies that assign suppliers environmental grades. These grades are made available to purchasing managers, who may base their purchasing decisions on such history.

There are also environmental labeling systems which consider possible adverse environmental effects of products when determining if the product qualifies to bear the label. Such systems have been used by governments and non-governmental organizations having a reputation regarding environmental matters and will be used in their assessment when providing their seal of approval or equivalent.

U.S. Pat. No. 7,096,084 describes a method for categorizing ingredients with the goal of formulating products having a reduced environmental "footprint." In accordance with the method in this patent, an ingredient can be assigned to an environmental class by choosing two categories of environmental concern from among many optional environmental categories. For example, aquatic toxicology, ultimate biodegradability, acute human toxicity lethal dose, European Union environmental classification, supplier source, and other significant concerns are disclosed as categories that can be considered for classifying a surfactant. In this method, the categories that can be considered for classifying an ingredient differ depending on the purpose of the ingredient; hence a single chemical could be assigned to two or more different environmental classes if it were added to a product for two or more different purposes, or if it were added to two or more similar products for two or more different purposes.

Also known are systems which adjust the grades of components used in a product by their relative weight in that product. For example, U.S. Pat. No. 5,933,765 discloses an environmental grading system in which a product containing multiple components has each of its input components provided with a numerical score based on toxicity. Each component is compared to a single published limit (such as a Dutch PPT Telecom standard) and a numerical value for that component is assigned. The scores are then weighted based on the relative percentage, by weight, of the raw material in the final product to provide an overall score for the resulting product. Regardless of the application of the raw material, only one possible score is provided for a given raw material chemical which is weighted by its prominence in the final product.

These environmental grading or rating systems do not provide an optimal system for formulating products where the use and potential environmental exposure patterns of all the products considered are similar. Methods that rely on the environmental performance of suppliers are not optimal for companies that use multiple sources for a single chemical component used in different regions or at different times. Methods that require each chemical component of a formulated product to be categorized depending on the component's function, which allows one chemical to achieve different environmental classifications as a result of the categorization, fail to recognize that the potential environmental effects of the component are not dependent on its function in a product, but rather, on its intrinsic environmental fate and effects characteristics and its exposure concentration in the environment, which are independent of its function in a product. Methods that consider only one aspect of environmental performance, such as toxicity, ignore environmentally relevant data that are readily available for many chemical components used n formulated products.

There exists a need for methods that evaluate the environmental impact of ingredients used in personal care products and methods for developing personal care products having a relatively safer environmental impact. These methods would evaluate the potential environmental impact of various chemical components in formulated personal care products and provide a decision support framework to reduce the potential environmental impact of these products based on those evaluations. It is desired that a system be developed for evaluating the environmental impact of chemical components and for formulating products having improved environmental characteristics. If a component in a product is known to have negative environmental attributes, environmental grading may be a deciding factor in determining whether that component is incorporated into the final product. In addition, there exists a need for a method that would allow a company to track its performance in reducing the environmental impact of the products that it produces.

SUMMARY OF THE INVENTION

In accordance with the present invention there has been provided a method for providing an environmental score to ingredients that may be used in a personal care product comprising;

selecting at least one ingredient that may be utilized in the personal care product, determining at least one alternative ingredient that is suitable for use in the personal care product, determining an environmental score for the ingredient and the at least one alternative ingredient; wherein the environmental score for the ingredient and the alternative ingredient is independent of the functional use of the ingredient and is based on environmental persistence, bioaccumulation through the food chain, direct toxicity to aquatic organisms, wherein a low environmental score indicated that the ingredient has a potentially negative impact on the environment and a high environmental score indicates that the ingredient does not have a potentially negative impact on the environment, and choosing the ingredient having the highest environmental score.

Also provided in accordance with the present invention is a method for developing a personal care product having a safer environmental impact comprising;

obtaining a preliminary formula for the product having a plurality of ingredients, selecting at least one ingredient that is utilized in the product, determining at least one alternative ingredient that is suitable for use in the product, determining an environmental score for the ingredient and the at least one alternative ingredient, wherein the environmental score for the ingredient and the alternative ingredient is independent of the functional use of the ingredient and is based environmental persistence, bioaccumulation through the food chain, direct toxicity to aquatic organisms, wherein a lower environmental score has a potentially negative impact on the environment and a higher environmental score has a potentially lower impact on the environment, and choosing the ingredient having the highest environmental score and incorporating that ingredient into the product.

In accordance with another embodiment of the invention, there has been provided a method of tracking a company's performance in providing products having a potential impact on the environment, comprising;

obtaining an existing formula for a commercial product having a plurality of ingredients, determining an environmental score for at least a portion of the plurality of ingredients, wherein the environmental score for the ingredients is based on environmental persistence, bioaccumulation through the food chain, direct toxicity to aquatic organisms, wherein a lower environmental score has a potentially negative impact on the environment and a higher environmental score has a potentially lower impact on the environment, determining a product score as a weighted average score, considering only the ingredients in the formula for which a score has been determined determining an uncertainty interval around the product score when one or more of the ingredients in the formula have not been assigned an environmental score, wherein the upper confidence limit is determined by recalculating the weighted average product score assuming the highest possible environmental score applies for all unscored ingredients in the formula, and the lower confidence limit is determined by recalculating the weighted average product score assuming the lowest possible environmental score apples for all unscored ingredients in the formula.

storing the environmental score and uncertainty interval for the commercial product.

DETAILED DESCRIPTION OF THE INVENTION

Figure 1:
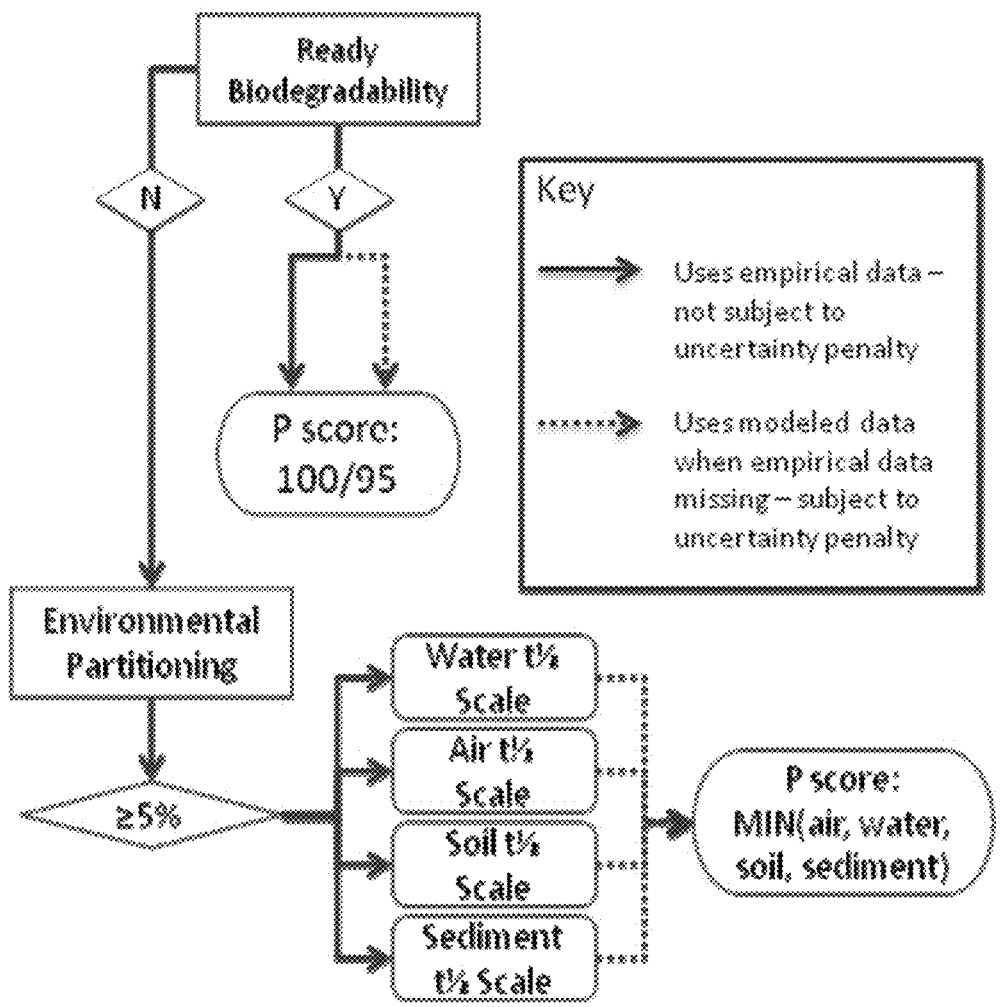
FIG. 1 is a flowchart illustrating a Persistence Scoring Process

The present invention relates to methods for producing formulated products with reduced environmental impact and is particularly useful in formulating consumer products such as health and beauty products such as shampoos, conditioners, skin care compositions and the like. The present invention provides a new process to guide product developers in the selection of environmentally preferred ingredients by assigning a score that measures the intrinsic environmental hazard of an ingredient. The process provides an environmental performance score for ingredients that may be used in personal care products. The process may be further used to guide product developers in the selection of environmentally preferred ingredients and/or to permit a company to track their progress in reducing the environmental impact of their products. It is considered an important aspect of the present invention that the process assigns a score that measures the intrinsic environmental hazard of an ingredient without regard to the functional use of the ingredient in a product. As used herein, the terminology "function" or "functional use" refers to the general classification of an ingredient that is intended to be used in a formulated product, such classifications include, for example, solvent, emulsifier, pH control agent, thickening agent, etc. Thus, the potential environmental impact of an ingredient is determined by its environmental fate, its effects characteristics and its mode of entry into the environment, but not its value or function within a product.

The process of the present invention encourages the use of ingredients that are readily biodegradable and have minimal impact to the ecosystem and optionally allows product formulators to include environmental performance as an additional criterion when selecting ingredients in new product development, and further may optionally provide a process to measure and track overall progress in environmental performance, not only by a product formulation but also by a business unit. Once a formula is created, a formula environmental score may be calculated based on the individual environmental scores of the ingredients contained in the formula. While there are numerous ways to measure environmental performance, environmental scores in accordance with the present invention mainly reflect three key properties of an ingredient, environmental Persistence, Bioaccumulation and direct Toxicity (the PBT properties), which predict an ingredient's environmental hazard. Environmental Persistence has been shown to lead to widespread environmental exposure and unanticipated effects that are difficult to reverse. Bioaccumulation through the food chain has been shown to lead to high exposure levels to humans and important predators. Direct Toxicity to aquatic organisms has been shown to cause ecosystem damage by reducing populations of important animals and plants.

The environmental score reflects the synthesis of information from a wide range of sources addressing the expected environmental fate and effects of each ingredient. These include the following:

a) biodegradability in rigorous laboratory tests, b) degradation half-life in the environment, c) buildup of the ingredient in fish tissue, measured in the laboratory as the "bioconcentration factor," and d) toxicity to a standard battery of aquatic test organisms, including invertebrates, algae, and fish, as measured in one- to four-day laboratory tests.

In accordance with the present invention, individual ingredients that are intended to be used in a formulated product are assigned an environmental score ranging from zero to 100. An environmental score of zero signifies that the ingredient has characteristics that could cause several different types of adverse environmental effects, under certain circumstances. An environmental score of 100 signifies that none of the characteristics evaluated suggests that the ingredient would pose an environmental concern when used in the final product. An environmental score that falls between these two extremes signifies an intermediate potential to cause adverse environmental effects. The use of a numeric score to measure the potential environmental hazard of an ingredient in a product will allow: shifting toward the use of more environmentally benign ingredients in new formulations, minimizing the use of ingredients that pose a potential environmental concern, tracking the use of scored ingredients, to provide the user with the ability to set goals for better scores and to measure progress in achieving these goals.

Thus each of the measures listed above for describing an ingredient's PBT properties are scaled between zero and 100. The scale for each PBT property is determined by assigning a score of 100 points to a consensus-based benchmark of no concern and assigning a score of zero points to a consensus-based benchmark of high concern. The scales for transforming the measures listed above to scores between zero and 100, and the benchmarks considered in deriving the scales, are shown in Table 1 through Table 5. The PBT (persistence, bioaccumulation, toxicity) score forms the basis of the present environmental scoring system and provides a measure of the intrinsic environmental hazard characteristics associated with an ingredient. The process for assigning a PBT score for an ingredient that is a distinct organic compound is described in the following sections.

An ingredient can be assigned an environmental performance score only when adequate data are available to completely characterize the PBT properties of the ingredient as listed above. Scores cannot be assigned if no reliable information is available to characterize persistence or bioaccumulation (with one exception—see Bioaccumulation Considerations for Readily Biodegradable Ingredients Section, below) or toxicity. Comparing ingredients head-to-head for the purpose of selecting an environmentally preferable alternative is ambiguous if each score is based on different characteristics. For example, if the environmental performance score could be assigned based on only one or two of the PBT characteristics, product formulators might select a non-bioaccumulative, low toxicity ingredient (with no information on persistence included in the score) over an ingredient of moderate persistence and low bioaccumulation potential and toxicity. However, the selected ingredient could be highly persistent, resulting in the process directing its user to select poorly.

The scores are based on empirical data whenever results from quality studies are available. When empirical data are lacking, predictive models may be used to fill data gaps by reviewing the content of numerous databases and environmental models, and the selection of a core set of comprehensive and reliable databases and models may be consulted for determining a score. The physical and chemical characteristics of each ingredient are compiled and evaluated to understand how the ingredient moves between water, sediment, soil, and air. The degradation rates for each ingredient when exposed to sunlight, water, and biodegrading microorganisms are compiled and evaluated to estimate the ingredient's persistence in the environment. The propensity of the ingredient to accumulate in the fat and tissues of fish are evaluated to understand the potential for the ingredient to bioaccumulate in the food chain. The concentrations of the ingredient that cause toxic effects to aquatic plants and animals from different levels of the food chain are evaluated to determine the potential toxicity of the ingredient in aquatic ecosystems. These evaluations of PBT properties form the basis of the ingredient's score.

The sub-scores for the P, B, and T characteristics are combined into a single numeric score by applying a weighting factor to each sub-score and summing them. The weighting factors account for the relative importance of P, B, and T characteristics, given the manner in which the ingredient is likely to enter the environment after its use in personal care products. Weighting factors differ for organic or inorganic ingredients, because the concepts of environmental persistence and bioaccumulation are defined differently for organic and inorganic compounds.

Final environmental performance scores are based on Persistence, Bioaccumulation and Toxicity with deductions for additional criteria (penalties). In the final score, a point reduction from an ingredient's PBT score is assessed if other pertinent environmental concerns have been raised by a government agency or in the peer-reviewed scientific literature. Four categories of these "other pertinent environmental concerns" are considered and any applicable point reductions are then applied to the PBT score, including photochemical smog-forming voc, potent chronic toxicity, formation of toxic metabolites and presence on a regulatory list.

Environmental Scoring for Ingredients that are Organic Compounds

Assigning a Persistence Score

Referring to FIG. 1, one must obtain the results of a ready biodegradability test. The ready biodegradability test is a stringent laboratory screening test which is conducted under aerobic conditions in which a relatively high concentration of test substance (2 to 100 mg/L) is exposed to microorganisms. Biodegradation is measured using a non-specific parameter such as carbon dioxide production. As stated in Organization for Economic Co-operation and Development (OECD), 2006, "OECD Guidelines for the Testing of Chemicals, Revised Introduction to the OECD Guidelines for Testing of Chemicals, Section 3", "given a positive result in a test of ready biodegradability, it may be assumed that the chemical will undergo rapid and ultimate biodegradation in the environment. In such cases, no further investigation of the biodegradability of the chemical, or of the possible environmental effects of transformation products, is normally required." Hence, if reliable empirical data indicate the ingredient is readily biodegradable, assign a persistence score of 100. In the absence of reliable empirical ready biodegradability data, it is acceptable to use a widely accepted predictive model (e.g., the computer model BIOWIN™ which is a widely recognized wastewater treatment process modeling and simulation package which predicts the result of a ready biodegradability test, and is included in US EPA, 2009) to determine ready biodegradability. If the model indicates the ingredient is readily biodegradable, persistence score is 100 minus a modeling uncertainty penalty (e.g., 5 points). If reliable empirical data indicate the ingredient is not readily biodegradable, or in the absence of reliable empirical data, if a widely accepted predictive model indicates the ingredient is not readily biodegradable; then the environmental media of concern will need to be determined.

Determining the Environmental Media of Concern.

The first step is to use a level III fugacity model to determine the environmental partitioning of the ingredient, accounting for its dominant emission pattern (e.g., emission to municipal wastewater). A level III fugacity model assumes a simple, evaluative environment with user-defined volumes and densities and can include the following homogeneous environmental media (or compartments): air, water, soil, sediment, suspended sediment, fish and aerosols. The media of concern are those predicted to contain more than a threshold proportion of the emitted ingredient (e.g., 5%).

The next step is to obtain data for the ingredient's half-life(s) in all media of concern. If reliable empirical data for half-life(s) are absent, estimate the half-life(s) on the basis of all relevant empirical data augmented by the results of widely accepted predictive models (e.g., the computer models, BIOWIN™, HYDROWIN™, and AOPWIN™ which predict the degradation rate of a chemical undergoing biodegradation, chemical degradation in water, or atmospheric chemical degradation, respectively and are included in United States Environmental Protection Agency (US EPA). 2009 Estimation Programs Interface Suite™ for Microsoft® Windows, v 4.00, United States Environmental Protection Agency, Washington, D.C., USA., if data gaps exist. BIOWIN™ estimates aerobic and anaerobic biodegradability of organic chemicals using seven different models. Two of these are the original Biodegradation Probability Program (BPP™). The seventh model estimates anaerobic biodegradation potential. HYDROWIN™ estimates aqueous hydrolysis rate constants and half-lives for the following chemical classes; esters, carbamates, epoxides, halomethanes, selected alkyl halides, and phosphorus esters, estimates rate constants for acid- and base-catalyzed hydrolysis, but with the exception of phosphorus esters, not neutral hydrolysis. In addition, HYDROWIN™ identifies a variety of chemical structure classes for which hydrolysis may be significant (e.g. carbamates) and gives relevant experimental data. AOPWIN™ estimates the gas-phase reaction rate for the reaction between the most prevalent atmospheric oxidant, hydroxyl radicals, and a chemical. Gas-phase ozone radical reaction rates are also estimated for olefins and acetylenes. In addition, AOPWIN™ informs the user if nitrate radical reaction will be important. Atmospheric half-lives for each chemical are automatically calculated using assumed average hydroxyl radical and ozone concentrations). The estimation can be done using a widely accepted predictive model (e.g., Estimation Program Interface (EPI) Suite. The EPI (Estimation Programs Interface) Suite™ is a Windows®-based suite of physical/chemical property and environmental fate estimation programs developed by the EPA's Office of Pollution Prevention Toxics and Syracuse Research Corporation (SRC). EPI Suite™ uses a single input to run the following estimation programs: KOWWIN™, AOPWIN™, HENRYWIN™, MPBPWIN™, BIOWIN™, BioHCwin™, KOCWIN™, WSKOWWIN™, WATERNT™, BCFBAF™, HYDROWIN™, KOAWIN™ and AEROWIN™, and the fate models WVOLWIN™, STPWIN™ and LEV3EPI™ as well as ECOSAR™, which estimates ecotoxicity. EPI Suite™ is a screening-level tool and should not be used if acceptable measured values are available. A clear understanding of the estimation methods and their appropriate application is very important.

Using the linear scoring scales in Table 1 (water), Table 2 (air), and/or Table 3 (soil/sediment) the half-life(s) are transformed to Persistence score(s) for the media of concern. If a score is based on an estimated half-life rather than an empirical half-life, that score should be reduced by an uncertainty penalty (e.g., 5 points). The overall ingredient persistence score is assigned as the minimum persistence score among the individual scores for the media of concern.

TABLE 1

Persistence Scoring Scale for Ingredients in Water

| Persistence Score | Fresh Water Half-life (days) | Regulatory Benchmarks Considered |
|---|---|---|
| 100 | <30 | 40 days - "Persistent" (2) |
| 75 | 66 | 60 days - threshold for testing, exposure control requirements (1), "Very Persistent" (2); "Persistent" (3) |
| 50 | 105 | |
| 25 | 142 | |
| 0 | ≥180 | 180 days - threshold for potential ban (1); "Very Persistent" (3) |
| | | 182 days - "Persistent" (4) |

(1) (United States Environmental Protection Agency (US EPA). 1999a. "Category for Persistent, Bioaccumulative, and Toxic New Chemical Substances." Federal Register. 64(213): 60194-60204.)
(2) (European Chemicals Bureau (ECB). 2003. "Technical Guidance Document in support of Commission Directive 93/67/EEC on Risk Assessment for new notified substances, Commission Regulation (EC) No 1488/94 on Risk Assessment for existing substances. Direction 98/8/EC of the European Parliament and of the Council concerning the placing of biocidal products on the market. Part II."
(3) (United States Environmental Protection Agency (US EPA). 1999b. "Persistent Bioaccumulative Toxic (PBT) Chemicals; Lowering of Reporting Thresholds for Certain PBT Chemicals; Addition of Certain PBT Chemicals; Community Right-to-Know Toxic Chemical Reporting." Federal Register. 64(209): 58665-58753.)
(4) (Environment Canada (EC). 2006. "Exiting Substances Evaluation: Categorization of the Domestic Substances List (DSL)." Internet content available (Oct. 11, 2009) at: http://www.ec.gc.ca/substances/ese/eng/dsl/cat_criteria_process.cfm)

TABLE 2

Persistence Scoring Scale for Ingredients in Air

| Persistence Score | Air Half-life (hours) | Regulatory Benchmarks Considered |
|---|---|---|
| 100 | <24 | 48 hours - "Persistent" (1), (2), (3) |
| 75 | 47 | 120 hours - described as used by regulatory bodies to determine if "a chemical should have restrictions on its uses." (1) |
| 50 | 72 | |
| 25 | 96 | |
| 0 | ≥120 | |

(1) (United States Environmental Protection Agency (US EPA). 1999b. "Persistent Bioaccumulative Toxic (PBT) Chemicals; Lowering of Reporting Thresholds for Certain PBT Chemicals; Addition of Certain PBT Chemicals; Community Right-to-Know Toxic Chemical Reporting." Federal Register. 64(209): 58665-58753.
(2) Gouin, T; Bocking, S; Mackay, D. 2005. "Policy by analogy: precautionary principle, science and polybrominated diphenyl ethers" Int. J. Global Environmental Issues. 5(1/2): 54-67.
(3) Environment Canada (EC). 2006. "Exiting Substances Evaluation: Categorization of the Domestic Substances List (DSL)." Internet content available (Oct. 11, 2009) at: http://www.ec.gc.ca/substances/ese/eng/dsl/cat_criteria_process.cfm

TABLE 3

Persistence Scoring Scale for Ingredients in Soil or Sediment

| Persistence Score | Sediment or Soil Half-Life (days) | Regulatory Benchmarks Considered |
|---|---|---|
| 100 | <50 | 60 days - threshold for testing, exposure control requirements (1); "Persistent" (2) |
| 75 | 81 | |
| 50 | 115 | 120 days - "Persistent" (3) |
| 25 | 147 | 180 days - threshold for potential ban (1); |
| 0 | ≥180 | "Very Persistent" (2), (3) |
| | | 182 days - "Persistent" in soil (4) |
| | | 365 days - "Persistent" in sediment (4) |

(1) (Unites States Environmental Protection Agency (US EPA). 1999a. "Category for Persistent, Bioaccumulative, and Toxic New Chemical Substances." Federal Register. 64(213): 60194-60204.)
(2) (United States Environmental Protection Agency (US EPA). 1999b. "Persistent Bioaccumulative Toxic (PBT) Chemicals; Lowering of Reporting Thresholds for Certain PBT Chemicals; Addition of Certain PBT Chemicals; Community Right-to-Know Toxic Chemical Reporting." Federal Register. 64(209): 58665-58753.)
(3) (European Chemicals Bureau (ECB). 2003. "Technical Guidance Document in support of Commission Directive 93/67/EEC on Risk Assessment for new notified substances, Commission Regulation (EC) No 1488/94 on Risk Assessment for existing substances. Direction 98/8/EC of the European Parliament and of the Council concerning the placing of biocidal products on the market. Part II.")
(4) (Environment Canada (EC). 2006. "Exiting Substances Evaluation: Categorization of the Domestic Substances List (DSL)." Internet content available (Oct. 11, 2009) at: http://www.ec.gc.ca/substances/ese/eng/dsl/cat_criteria_process.cfm)

Assigning a Bioaccumulation Score

Figure 2:
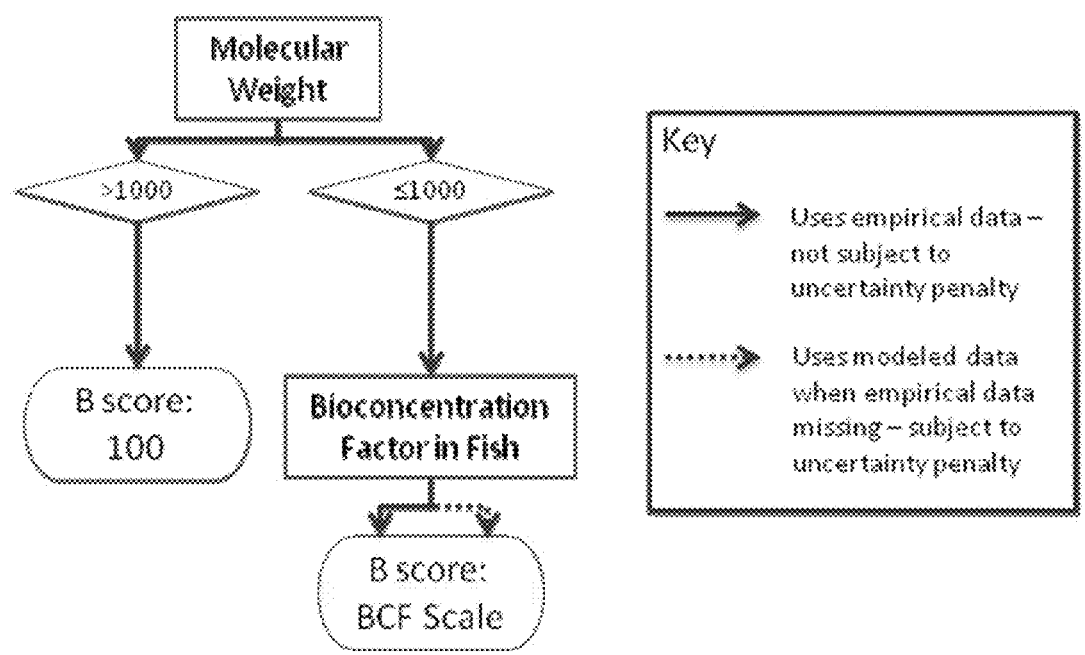
FIG. 2 is a flowchart illustrating a Bioaccumulation Scoring Process

Referring to FIG. 2 there is shown a process for assigning a bioaccumulation score. The first step is to determine the molecular weight of the ingredient. If the molecular weight exceeds 1000 Daltons, the ingredient is expected to have a low bioavailability and hence a low potential for bioaccumulation (US EPA, 1999). Under these circumstances, a bioaccumulation score of 100 is assigned. If the molecular weight is less than or equal to 1000 Daltons, the possibility of bioaccumulation cannot be ruled out; it is possible to obtain data for the ingredient's bioconcentration factor (BCF) in fish. If reliable empirical data are absent, estimate the BCF using a widely accepted predictive model, such as, for example BCFBAF™, formerly called BCFWIN™. This program estimates fish bioconcentration factor and its logarithm using two different methods. The first is the traditional regression based on log $K_{OW}$ plus any applicable correction factors, and is analogous to the WSKOWWIN™ method. The second is the Arnot-Gobas method, which calculates BCF from mechanistic first principles. BCFBAF™ also incorporates prediction of apparent metabolism half-life in fish, and estimates BCF and BAF for three trophic levels.). In the present examples, the Quantitative structure-activity relationship (QSAR) models from the ECB (2003) were used. The QSAR model, is the process by which chemical structure is quantitatively correlated with a well defined process, such as biological activity or chemical reactivity. For example, biological activity can be expressed quantitatively as in the concentration of a substance required to give a certain biological response. Additionally, when physicochemical properties or structures are expressed by numbers, one can form a mathematical relationship, or quantitative structure-activity relationship, between the two. The mathematical expression can then be used to predict the biological response of other chemical structures.

QSAR's most general mathematical form is:

$$\text{Activity} = f(\text{physiochemical properties and/or structural properties})$$

TABLE 4

Bioaccumulation Scoring Scale

| Bioaccumulation Score | Fish BCF (L/kg) | Regulatory Benchmarks Considered |
|---|---|---|
| 100 | <100 | 100 L/kg - value below which bioaccumulation is ruled out as a concern (1) |
| 75 | 575 | |
| 50 | 1050 | 500 L/kg - described as "low level of bioconcentration (2) |
| 25 | 1525 | |
| 0 | ≥2000 | 1000 L/kg - threshold for testing, exposure control requirements (3) |
| | | 2000 L/kg - "Bioaccumulative" (4) |
| | | 5000 L/kg threshold for potential ban (5) |
| | | "Very Bioaccumulative" (6) |
| | | "Bioaccumulative" (7) |

(1) European Commission (EU Comm). 2001. "Commission Directive 2001/59/EC of 6 Aug. 2001 adapting to technical progress for the 28th time Council Directive 67/548/EEC on the approximation of the laws, regulations and administrative provisions relating to the classification, packaging and labeling of dangerous substances."
(2) United Nations (UN). 2007. "Globally Harmonized System of Classification and Labelling of Chemicals (GHS) Second revised edition."
(3) United States Environmental Protection Agency, 1999a; "Bioaccumulative", (US EPA, 1999b)
(4) ECB, 2003 European Chemicals Bureau (ECB). 2003. "Technical Guidance Document in support of Commission Directive 93/67/EEC on Risk Assessment for new notified substances, Commission Regulation (EC) No 1488/94 on Risk Assessment for existing substances. Direction 98/8/EC of the European Parliament and of the Council concerning the placing of biocidal products on the market. Part II."
(5) US EPA, 1999a; Unites States Environmental Protection Agency (US EPA). 1999a. "Category for Persistent, Bioaccumulative, and Toxic New Chemical Substances." Federal Register. 64(213): 60194-60204.
(6) (US EPA, 1999b) United States Environmental Protection Agency (US EPA). 1999b. "Persistent Bioaccumulative Toxic (PBT) Chemicals; Lowering of Reporting Thresholds for Certain PBT Chemicals; Addition of Certain PBT Chemicals; Community Right-to-Know Toxic Chemical Reporting." Federal Register. 64(209): 58665-58753.
(7) Environment Canada (EC). 2006. "Exiting Substances Evaluation: Categorization of the Domestic Substances List (DSL)." Internet content available (Oct. 11, 2009) at: http://www.ec.gc.ca/substances/ese/eng/dsl/cat_criteria_process.cfm Using the linear scoring scale in Table 4, the BCF is transformed to a bioaccumulation score for the ingredient. If the score is based on an estimated BCF rather than an empirical BCF, reduce the score by an uncertainty penalty (e.g., 5 points).

Assigning a Toxicity Score

Figure 3:
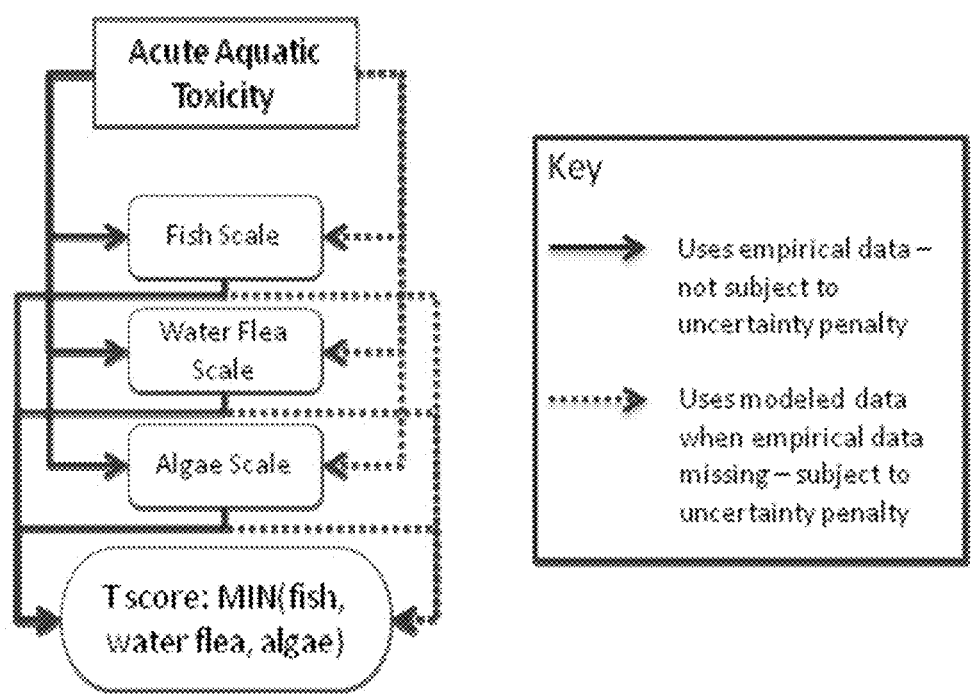
FIG. 3 is a flowchart illustrating a Toxicity Scoring Process

Referring to FIG. 3, one may obtain acute aquatic toxicity benchmarks from three indicator organisms representing one primary producer (e.g., the chemical concentration causing a 50% inhibition in the algae growth rate in a 72-hour study, or an algae EC50), one primary consumer (e.g., the chemical concentration causing immobilization to 50% of a water fla population in a 48-hour study using Daphnia species, or a daphnid EC50), and one secondary consumer (e.g., the chemical concentration in water causing mortality to 50% of a fish population in a 96-hour study, or a fish LC50). If reliable empirical data are absent, estimate the aquatic toxicity benchmarks listed above using a widely accepted predictive model (e.g., The Ecological Structure Activity Relationships (ECOSAR) Class Program which is a computerized predictive system that estimates the aquatic toxicity of industrial chemicals. The program estimates a chemical's acute (short-term) toxicity and chronic (long-term or delayed) toxicity to aquatic organisms such as fish, aquatic invertebrates, and aquatic plants by using Structure Activity Relationships (SARs). Structure Activity Relationships, or SARs, is a technique routinely used by the U.S. EPA Office of Pollution Prevention and Toxics under the New Chemicals Program to estimate the toxicity of industrial chemicals being reviewed in response to Pre-Manufacture Notices mandated under Section 5 of the Toxic Substances Control Act (TSCA). Through publication of ECOSAR, the U.S. EPA provides public access to the same methods the EPA uses for evaluating aquatic toxicity.)

If several benchmarks exist for a single class of aquatic indicator organism (i.e., primary producer, primary consumer, secondary consumer), the lowest L(E)C50 value is selected from a reliable study as the applicable benchmark for that organism. If no acute toxicity occurs at the ingredient's limit of water solubility in all reliable empirical studies (or in the absence of empirical studies, in model predictions), a default toxicity score less than 100 is assigned for that organism (e.g., 70 points) to account for uncertainty regarding the potential for adverse effects to occur over certain circumstances, including longer exposure periods.

Using the linear scoring scale in Table 5 (below), each of the three organism L(E)C50 values (i.e., LC50 or EC50 values) are transformed to an organism-specific toxicity score for the ingredient. If the organism-specific toxicity score is based on an estimated L(E)C50 value rather than an empirical L(E)C50 value, that score is reduced by an uncertainty penalty (e.g., 5 points).

TABLE 5

Toxicity Scoring Scale

| Toxicity Score | L(E)C50 (mg/L) | Regulatory Benchmarks Considered |
|---|---|---|
| 100 | ≥100 | 100 mg/L - Threshold for acute or chronic category 3 (1) |
| 75 | 75 | |
| 50 | 51 | 100 mg/L - maximum test concentration |

TABLE 5-continued

Toxicity Scoring Scale

| Toxicity Score | L(E)C50 (mg/L) | Regulatory Benchmarks Considered |
|---|---|---|
| 25 | 26 | required in OECD acute aquatic test guidelines |
| 0 | ≤1 | 10 mg/L - Threshold for acute or chronic category 2 (1) |
| | | 1 mg/L - Threshold for acute or chronic category 1 (1); "Inherently Toxic" (2). |

(1) United Nations (UN). 2007. "Globally Harmonized System of Classification and Labelling of Chemicals (GHS) Second revised edition." Internet content available (Oct. 11, 2009) at: http://www.unece.org/trans/danger/publi/ghs/ghs_rev02/02files_e.html
(2) Environment Canada (EC). 2006. "Exiting Substances Evaluation: Categorization of the Domestic Substances List (DSL)." Internet content available (Oct. 11, 2009) at: http://www.ec.gc.ca/substances/ese/eng/dsl/cat_criteria_process.cfm The overall ingredient toxicity score is determined as the minimum organism-specific toxicity score. If no score could be determined for one class of aquatic indicator organism (i.e., primary producer, primary consumer, secondary consumer), the overall ingredient toxicity score is reduced by an uncertainty penalty (e.g., 5 points). If no score could be determined for two classes of aquatic indicator organisms, the overall ingredient score is reduced by a larger uncertainty penalty (e.g., 10 points).

Environmental Scoring for Ingredients that are Inorganic Compounds

Assigning a Persistence Score

Persistence for inorganic compounds is defined differently than for organic compounds in the present invention. Inorganic compounds and/or their environmental degradants are infinitely persistent and typically naturally-occurring. Hence, the persistence of all of the potentially toxic or bioaccumulative forms (e.g., forms where the bioaccumulation and toxicity scores are less than 100) of the ingredient and its environmental degradants are considered using empirical data from the peer-reviewed literature. The lowest persistence score among the ingredient and its environmental degradants is assigned as the final persistence score. When the ingredient and its potential degradants are not potentially bioaccumulative or toxic (e.g., the bioaccumulation and toxicity scores are not less than 100), the persistence score assigned is 100.

For example, for the personal care product inorganic ingredient, zinc oxide, both the ingredient ZnO and the degradant $Zn^{2+}$ are evaluated. Based on empirical data from the peer-reviewed literature, using the toxicity scoring process for organic ingredients above, both are potentially toxic to aquatic organisms with a toxicity score of zero. As a result, the environmental half-life of ZnO and $Zn^{2+}$ are evaluated using empirical data from the peer-reviewed literature. Both forms can persist for long periods of time water, sediment, and soil under certain conditions, and using the persistence scoring scales for organic ingredients in Table 1 and Table 3, a persistence score of zero results.

Assigning a Bioaccumulation Score

An empirical BCF in fish and/or evidence from the peer-reviewed scientific literature are used to determine the Bioaccumulation score. If an empirical value for BCF in fish is available, the Bioaccumulation scoring scale in Table 4 is used to determine a tentative Bioaccumulation score. However, some inorganic chemicals appear to bioconcentrate only when they are present in low environmental concentrations, because they are essential nutrients, and organisms preferentially absorb the chemical. The peer-reviewed scientific literature must be consulted for evidence of adverse bioaccumulation effects and/or a false indication of bioaccumulation concerns due to a high BCF value determined for essential nutrients at low environmental concentrations.

For example, for the personal care product inorganic ingredient, zinc oxide, the 2001 World Health Organization International Programme on Chemical Safety Environmental Health Criteria 221 "Zinc" stated: "In the case of zinc, the BCF is not useful for relating uptake to adverse effects, because it does not consider physiological parameters . . . . The fact that zinc, as an essential metal, is naturally concentrated by living organisms means that the BCF for zinc bears no relationship to toxicity. Bioaccumulation does not differentiate between zinc adsorbed to the outer surface of organisms, and the zinc within organisms. Rapid bio-inactivation of zinc, for instance compartmentation into vacuoles, may result in elevated BCFs with no difference in the health of the organism . . . . Further, the fact that many organisms are capable of regulating internal zinc concentrations within certain limits means that these organisms can stabilize internal concentrations against perturbations or high concentrations in the external environment . . . . Accumulation of zinc to meet physiological requirements can be mistaken for trophic transfer. However, zinc is not biomagnified . . . ." Based on this information published by a reputable source indicating that there is no concern for adverse environmental effects due to bioaccumulation, zinc oxide was assigned a Bioaccumulation score of 100, independent of any empirical BCF values available in the peer-reviewed literature.

Assigning a Toxicity Score

The process used for ingredients that are organic compounds is also used for ingredients that are inorganic compounds with the following exceptions: (1) only empirical data are considered, as models for predicting the aquatic toxicity of metals are not widely available; (2) the toxicity of the ingredient and all plausible environmental degradants are calculated. The lowest Toxicity score among the ingredient and its plausible environmental degradants is assigned as the final Toxicity score for the ingredient.

Assigning a PBT Score for Inorganic Ingredients and Organic Ingredients that are not Readily Biodegradable A numeric weight value for each of the persistence (P), bioaccumulation (B), and toxicity (T) categories is assigned, such that the sum of weights is 100%. The assigned weight indicates the relative importance of the category (i.e., P, B, or T), and can be changed depending on the potential adverse environmental effects most heavily targeted for reduction. In accordance with the present invention, the assigned weights are 50% P, 25% B, and 25% T for ingredients that are organic compounds. The category weight is multiplied by the category score for each category (i.e., P, B, and T) and the overall PBT score for the ingredient is the sum of the category weight multiplied by category score for each category according to the following Equation 1.

$$\text{Score}_{PBT} = \Sigma_{i=1}^{i} w_i \cdot \text{Score}_i \qquad \text{Equation 1}$$

where
  $\text{Score}_{PBT}$=ingredient's PBT score
  $w_i$=category weight for category i where i=P, B, or T
  $\text{Score}_i$=ingredient's category score for category i where i=P, B, or T
and where $$\Sigma_{i=1}^{3} w_i = 100\%$$

Assigning a PBT Score for Inorganic Ingredients and Organic Ingredients that are Readily Biodegradable When an ingredient is readily biodegradable, it is expected to rapidly and completely degrade in a sewage treatment plant and/or in the environment. As a result, the relative importance of the Bioaccumulation and the Toxicity scores is different for readily biodegradable ingredients than for ingredients that are not readily biodegradable. Specifically, toxicity is important in a limited spatial extent around the discharge point of a sewage treatment plant operating with a low treatment efficiency, or where wastewater is discharged without treatment. Bioaccumulation is not expected to be important. As a result, the PBT score is assigned differently for readily biodegradable ingredients in the present invention.

Toxicity Considerations for Readily Biodegradable Ingredients

Toxicity can be important, but to a limited spatial extent. A compound that is readily biodegradable can be present in sewage treatment plant (STP) discharges. A readily biodegradable compound can take as long as 28 days to completely degrade in a lab test, but STPs have much shorter hydraulic retention times, on the order of hours, albeit with more favorable conditions for degradation than the ready biodegradability laboratory test.

Hence, in the vicinity of an STP, particularly one operating with performance low treatment efficiency, or in communities where wastewater is not treated, there could be a continual load of a readily biodegradable compound to a receiving water. In that vicinity, wildlife would be exposed to the readily biodegradable compound. If the receiving water is a river, the compound's concentration will decrease with distance downstream due to biodegradation and other processes (e.g., dilution), so that exposure and the possibility for toxic effects decrease, eventually to zero.

In the present invention, the Toxicity component of the PBT score for readily biodegradable ingredients is retained with a weight of 25%, because it is preferable to use an ingredient of low toxicity to protect against the possibility that exposure will occur in a limited spatial extent around an STP or near a raw wastewater discharge.

Bioaccumulation Considerations for Readily Biodegradable Ingredients

Bioaccumulation is much less likely a concern than toxicity for a readily biodegradable compound, because of the limited spatial extent exposure would occur. For example, a fish's forage range (the area over which the fish swims and eats) can be much larger than the limited area of influence adjacent to and downstream from discharges containing the readily biodegradable ingredient.

As a result, when a compound is readily biodegradable, in the present invention, the following is done: (1) Assign a Persistence score of 100 (or 95 if a model was used in lieu of empirical data) (2) Use component weighting factors such as 75% for Persistence, 0% for Bioaccumulation, and 25% for Toxicity to reflect the diminished importance of bioaccumulation for readily biodegradable ingredients and calculate the PBT score as described in Equation 1, and (3) Determine the BCE If the BCF cannot be determined or if the BCF would result in a Bioaccumulation score of zero, a penalty (e.g., 5 points) is taken off the final PBT score. The rationale for the penalty is that there is some uncertainty about whether bioaccumulation can be completely ruled out for high-BCF compounds in the limited area of influence adjacent to and downstream from discharges containing the readily biodegradable ingredient.

Assigning a Final Environmental Performance Score for All Ingredients

The PBT score is the final environmental performance score, barring other environmental concerns. In the present invention, four categories of other environmental concerns are evaluated for every ingredient scored. If other environmental concerns are identified, the PBT score is reduced by a penalty, with the total penalty not to exceed some threshold point value (e.g., 25 points), determined to reflect the importance of the issues addressed by the penalties relative to Persistence, Bioaccumulation, and Toxicity.

Assessing Penalties to the PBT Score

Photochemical Smog-Forming Volatile Organic Compound (VOC) Penalty

The Photochemical Smog Forming VOC penalty accounts for the potential for ingredients that are VOCs to contribute to ground-level ozone formation (i.e., photochemical smog). The Statewide Air Pollution Research Center (SAPRC) developed quantitative measures for the ozone forming potential of a chemical, for use in air quality simulation models approach was developed for prevailing atmospheric conditions in California. The SAPRC approach assigns Maximum Incremental Reactivity (MIR) values for chemicals and chemical classes. A higher MIR value indicates a more reactive compound with a greater tendency to form ground level ozone.

In the present invention, in order to qualify for the photochemical smog-forming VOC penalty, an ingredient must be a volatile organic chemical (VOC), defined as having a boiling point less than 250° C., and it must have been assigned a positive value for the maximum incremental reactivity (MIR). In the present invention, all qualifying ingredients are assessed equal penalties (i.e., 5 points). Optionally, a numeric MIR value screening value greater than zero (e.g., 5.0 grams ozone per gram VOC) can be applied to assign different point penalties depending on the tendency of the ingredient to cause the formation of ground-level ozone. A lower penalty (e.g., 3 points) can be applied for qualifying ingredients with a MIR value less than the screening value, and a higher penalty (e.g., 6 points) can be applied for qualifying ingredients with a MIR value greater than the threshold. The present invention does not apply a MIR screening value greater than zero because the MIR values have not yet undergone a comprehensive technical peer review.

Potent Chronic Toxicity Penalty

A chemical's toxic potency to aquatic organisms is determined in laboratory exposures over short periods of time (acute tests) or long periods of time (chronic tests), relative to the life span of the organism. A chronic, or long-term, exposure to a low concentration of personal care products in water is the most probable environmental exposure scenario. Hence, chronic test results are most relevant for the environmental performance score. However, information on the chronic toxicity of ingredients in personal care products is rarely available. Normally, the acute toxicity of a chemical (i.e., L(E)C50) is proportional to the chronic toxicity of the chemical, with a ratio usually less than 1000. Therefore, the L(E)C50 is a useful surrogate for chronic effects when used to compare similar chemicals. The use of L(E)C50 values as a surrogate for comparison purposes fails where the chemical is highly reactive with a specific biological system so that adverse effects occur at extremely low environmental concentrations.

In the present invention, the Potent Chronic Toxicity Penalty is used for ingredients that have been clearly identified in the scientific literature as capable of eliciting adverse effects at low concentrations in the environment due to endocrine disruption, but have not yet been identified as such by regulatory authorities (ingredients identified as endocrine disruptors by regulatory authorities are penalized as part of the Regulatory List Penalty described below). In the present invention, this penalty accounts for potential environmental (i.e., not human health) effects of ingredients that have been shown to elicit estrogen-like effects to fish. Feminization of fish has been observed in natural waters, and is a cause of concern among regulators, non-governmental organizations, and the public. Chemicals with estrogen-like activity can cause the feminization of male fish leading to population declines.

In order to qualify for the Potent Chronic Toxicity Penalty, peer-reviewed scientific literature must show that the ingredient elicits adverse aquatic effects to wildlife at lower concentrations than would be expected based on the L(E)C50 value (assuming an acute-to-chronic ratio of 1000). In the present invention, all qualifying ingredients are assessed a single numeric penalty (e.g., 5 points). Optionally, qualifying ingredients can be assessed a penalty proportionate to the additional toxic potency demonstrated in chronic tests, relative to the chronic toxic potency suggested by the minimum L(E)C50 value divided by the typical maximum acute-to-chronic ratio of 1000.

Formation of Toxic Metabolites Penalty

Some chemicals degrade in sewage treatment plants (STPs) or the environment to form metabolites having a toxic potency greater than that of the chemical originally discharged to the STP or the environment.

In accordance with the present invention, the Toxic Metabolites Penalty is used for some types of ethoxylated surfactants, which are a particular category of compounds widely identified as a concern for the aquatic environment by scientists, regulatory authorities, and non-governmental organizations. Certain ethoxylated surfactants can undergo rapid primary biodegradation, but can form more persistent and toxic alkylphenol ethoxylate (APE) compounds.

In order to qualify for the Formation of Toxic Metabolites Penalty, peer-reviewed scientific literature must show that the ingredient is degraded in STPs or the environment to form metabolites that are more potent toxicants to wildlife than the ingredient. In the present invention, all qualifying ingredients are assessed a single numeric penalty (e.g., 5 points). Optionally, qualifying ingredients can be assessed a penalty proportionate to the additional toxic potency of metabolites compared to the ingredient from which they were formed.

Regulatory List Penalty

Some chemicals have been identified as causing adverse environmental effects for reasons not addressed in the PBT score or in the three penalty categories described above. For example, chemicals that deplete stratospheric ozone were identified in the Montreal Protocol on Substances That Deplete the Ozone Layer. The European Commission published a database on candidate endocrine disruptors (http://ec.europa.eu/environment/endocrine/strategy/substances_en.htm) in which chemicals were assigned to Category I or Category II if empirical evidence existed for endocrine disruption effects.

In order to qualify for the Regulatory List Penalty, an ingredient must be identified on a regulatory list due to environmental hazards not already addressed in the PBT score or in the three penalties listed above. In the present invention, all qualifying ingredients are assessed a single numeric penalty (e.g., 5 points). Optionally, qualifying ingredients can be assessed a penalty proportionate to the number and severity of additional hazards identified by regulatory authorities. To assign the final environmental performance score for an ingredient, the final score is equal to the PBT score minus the sum of all penalties assessed.

In accordance with another embodiment of the invention, color codes may be assigned to the ingredients based on the final environmental performance scores. Color codes can be used to assist with the interpretation of numeric scores. In a preferred embodiment a first color is associated with an ingredient having an environmental score between 100-80, a second color is associated with an ingredient having an environmental score between 79-61 and a third color is associated with an ingredient having an environmental score 60-0 and wherein the first, second and third colors are all different. In a most preferred embodiment, the color codes are:

Green—Meaning that little to no environmental hazard is associated with the ingredient. Ingredient is preferred for use (e.g., environmental performance score 100-80).

Yellow—Meaning that low to moderate environmental hazard is associated with this ingredient. These ingredients are acceptable for use unless a Green alternative can be substituted. (e.g., environmental performance score 79-61)

Red—Meaning that this ingredient might potentially present an environmental hazard and should be avoided if possible (e.g., environmental performance score 60-0).

To assign the environmental performance score for a finished product, the following values are calculated for each non-water ingredient in the finished product:
1. Water-Included Weighting Factor=the weight fraction of the ingredient in the finished product.
2. Water-Excluded Weighting Factor=Water-Included Weighting Factor of the ingredient/(1−Water-Included Weighting Factor of water).
3. Scored Ingredients Only Weighting Factor=for non-water ingredients in the finished product for which environmental performance scores have been determined only: Water-Excluded Weighting Factor/Fraction of Non-Water Ingredients Scored.
4. Weighted Scores.
   a. Water-Included Minimum Weighted Score=Water-Included Weighting Factor×ingredient environmental performance score (0 for unscored ingredients).
   b. Water-Included Maximum Weighted Score=Water-Included Weighting Factor×ingredient environmental performance score (100 for unscored ingredients)
   c. Water-Excluded Minimum Weighted Score=Water-Excluded Weighting Factor×ingredient environmental performance score (0 for unscored ingredients)
   d. Water-Excluded Maximum Weighted Score=Water-Excluded Weighting Factor×ingredient environmental performance score (100 for unscored ingredients)
   e. Scored Content Only Ingredient Score=Scored Ingredients Only Weighting Factor×ingredient environmental performance score (0 for unscored ingredients)

The following values are calculated for the finished product:
1. Fraction of Non-Water Ingredients Scored=for all non-water ingredients having an environmental performance score in the finished product, the sum of the Weight Fraction of Ingredient in Finished Product
2. Water-Included
   a. Water-Included Minimum Possible Score=sum of all ingredient Water-Included Minimum Weighted Score values b. Water-Included Maximum Possible Score=sum of all ingredient Water-Included Maximum Weighted Score values 3. Water-Excluded
   a. Water-Excluded Minimum Possible Score=sum of all ingredient Water-Excluded Minimum Weighted Score values except the value for water
   b. Water-Excluded Maximum Possible Score=sum of all ingredient Water-Excluded Maximum Weighted Score values except the value for water
   c. Finished Product Scored Content Only Score=sum of all Scored Content Only Ingredient Score values The Finished Product Scored Content Only (FPSCO) Score is the weighted score for all scored non-water ingredients in the product, and is one indicator of the environmental preferability of the formula. The Water Excluded Minimum Possible Score and Water Excluded Maximum Possible Score bracket the uncertainty around the FPSCO Score as the scored content increases to 100% and is a second indicator of the environmental preferability of the formula.

Compare the FPSCO Scores. The formula with a higher FPSCO score is tentatively selected as the environmentally preferable alternative. When FPSCO Scores are similar for several formulas (e.g., within 5 points of each other), the scores can be considered a "tie." A scoring difference within a certain threshold (e.g., five points) can be considered negligible, because of uncertainty in the scores. Uncertainty in environmental performance scores arises from practices such as using short-term laboratory test results to estimate long-term effects in the environment, and using information about an ingredient's toxicity to only a few types of organisms as a way to estimate effects on all forms of wildlife. To break ties, or to confirm a tentative formula selection, evaluate additional scoring metrics.

Consider uncertainty in the FPSCO Scores caused by the use of ingredients for which no environmental performance scores have been assigned. For example: Formula A has an FPSCO Score of 100, but only 10% of the ingredients in Formula A has environmental performance scores assigned, leading to a high degree of uncertainty in the "true score" that would result if the remaining 90% of the formula had environmental performance scores assigned; in contrast, Formula B has a "Final" score of 85, but much more of Formula B—80% of the ingredients—has environmental performance scores assigned. In this case, the "Final" score for Formula B is lower than for Formula A, but there is much less uncertainty in the environmental safety of Formula B. This uncertainty can be understood using Water Included Minimum Possible Score and Water Included Maximum Possible Score, which bracket the uncertainty around the FPSCO Score as the scored content increases to 100%. The Water Excluded Minimum Possible Score is the FPSCO Score that would result if all the unscored ingredients were assigned a score of zero. The Water Excluded Maximum Possible Score is the FPSCO Score that would result if all the unscored ingredients were assigned a score of 100.

In some cases, it will be preferable to select a formula with a lower FPSCO Score, if that formula's Water Excluded Minimum Possible Score is substantially higher than for alternative formulas being considered. For example, the Water Excluded Minimum Possible Scores for Formulas A and B (above) are 10 and 68, respectively. As a result, Formula B is preferable because its score is in the "green" range, and the worst possible FPSCO Score it could receive if all its ingredients were assigned environmental performance scores is in the "yellow" range. In contrast, it is possible that Formula A would receive an FPSCO Score in the "red" range if all of its ingredients were assigned environmental performance scores, because its Water Excluded Minimum Possible Scores score is 10.

Environmental Scoring Process—Example: Glycerin (Glycerol)

Persistence Considerations
1. Partitioning Determined in EPI Suite Level IR Fugacity Model
   5% threshold not reached in sediment, soil, air, hence only persistence in water considered
2. Ready Biodegradability Data
   Readily biodegradable according to empirical studies
   Persistence score=100

Bioaccumulation Considerations
1. Molecular weight (i.e., bioavailability) check
   Less than 1000 g/mol threshold, hence the possibility of bio accumulation concerns cannot be ruled out
2. Fish bioconcentration factor (BCF) check needed
   Empirical fish BCF: not available
   Modeled fish BCF uses empirical octanol-water partition coefficient
   Results in BCF much less than the 5,000 L/kg threshold of concern for readily biodegradable ingredients
   Bioaccumulation score=100

Aquatic Toxicity Considerations
1. Empirical data from acute studies available for all three trophic levels
   Invertebrate/Primary Consumer—water flea, 50% immobilization (EC50)
   Vertebrate/Secondary Consumer—fish, 50% lethality (LC50)
   Aquatic Plant/Primary Producer—algae, 50% inhibition in growth rate (EC50)
2. Benchmarks translated to scores
   Invertebrate EC50=10,000 mg/L, hence score=100
   Fish LC50=5,000 mg/L, hence score=100
   Aquatic Plant EC50=46,000 mg/L, hence score=100
   Toxicity score=100 (i.e., minimum of three scores above—no penalties assessed for missing trophic levels or use of modeled data in lieu of empirical data)

Final Ingredient Score
1. PBT Score
   P: 100×75% weight
   B: <5000—no penalty
   T: 100×25% weight
2. Additional Considerations (Potential Reductions to PBT Score)
   Photochemical Smog-Forming VOC Penalty—NO
   Potent Chronic Toxicity Penalty—NO
   Formation of Toxic Metabolites Penalty—NO
   Regulatory List Penalty—NO
   Final Score=100 (i.e., 100−0)

In another preferred embodiment, the environmental score for an ingredient would incorporate information on an even wider array of issues associated with environmental sustainability. The present method develops environmental scores for ingredients and formulations and encourages formulators to move toward more environmentally preferred ingredients and formulations. The methods described above may be utilized to track and improve the environmental performance of a company, business unit, product line, brand, product function (e.g., shampoo, lotion), or product type (e.g., rinse off, leave on) by using the environmental scores for ingredients or finished products in metrics derived from those scores to show trends in environmental performance over time and identify organization-wide formulation changes needed to improve future environmental performance including:

(1) Evaluating the environmental scoring profile of the ingredients sold in a product portfolio by combining the mass of all ingredients sold across all products in an organization; treating the list of ingredients and their masses sold as a single master formula; determining the environmental score of the master formula; setting a goal to achieve an improvement in the environmental score of the master formula over a certain time interval by intentionally replacing lower-scoring ingredients with higher-scoring ingredients in new or reformulated products, or (2) Measuring the total mass of each low-scoring ingredient (i.e., ingredients for which the environmental score is below a certain threshold score) sold during a certain period of time; setting a goal to reduce the use of low-scoring ingredients by a certain amount or percent over a certain period of time; optionally prioritizing lower-scoring, higher-volume ingredients for replacement by higher-scoring substitutes using a score-normalized mass value to rank all low-scoring ingredients in order of priority for potential replacement where:

$$\text{score-normalized mass} = \frac{\text{mass sold}}{\text{environmental score}}$$

and where a higher score-normalized mass value indicates a higher priority for substitution, or (3) Setting targets for finished product scores for an organization's top selling products, such that at certain time intervals, the finished product scores are calculated for the individual products that comprise a certain percent of the organization's total sales; any of these products for which the score is less than a certain threshold score are targeted for reformulation to improve the score above the threshold.

We claim:

1. A computer-implemented method for formulating and producing a product with environmentally preferred ingredients comprising;

obtaining a preliminary formula for the product having a plurality of chemical ingredients, each chemical ingredient having a predefined functional category, determining at least one alternative chemical ingredient within the functional category that is suitable for use in the product, determining an environmental score for the chemical ingredient and the at least one alternative chemical ingredient; wherein the environmental score for the chemical ingredient and the alternative chemical ingredient is based on environmental persistence, bioaccumulation through the food chain and direct toxicity to aquatic organisms; wherein the environmental score for the ingredient and the at least one alternative ingredient is determined without regard to the functional use of the ingredient; wherein the presence of water in the formulation, if any, is not included as either a chemical ingredient or used in determining the environmental score for the formulation;

wherein the ingredient is assigned an environmental score ranging from zero to 100 and wherein the environmental score of zero signifies that the ingredient has characteristics that could cause several different types of adverse environmental effects and an environmental score of 100 signifies that none of the characteristics evaluated suggests that the ingredient would pose an environmental concern when used in the personal care product;

wherein if the environmental score for said alternative ingredient is higher than the environmental score of said chemical ingredient, then the alternative ingredient is incorporated into the product in place of said chemical ingredient.

2. The method of claim 1, wherein the method includes the further step of determining a score for an environmental performance of each individual chemical ingredient within the formulation.

3. The method of claim 2, wherein a first color is associated with an ingredient having an environmental score between 100-80, a second color is associated with an ingredient having an environmental score between 79-61 and a third color is associated with an ingredient having an environmental score 60-0 and wherein the first, second and third colors are all different.

4. The method of claim 3, wherein the first color is green, the second color is yellow and the third color is red.

5. The method according to claim 1 wherein the environmental score is further based on toxicity to aquatic organisms through partial degradation to form more toxic metabolites, endocrine disruption to aquatic organisms, photochemical smog formation, and inclusion on worldwide regulatory lists due to other potential effects to wildlife not otherwise considered in the environmental score such as ozone depletion.

6. A method according to claim 1 wherein said product is a personal care product.

7. A method according to claim 6 wherein said personal care product is selected from the group consisting of health and beauty products, shampoos, conditioners and skin care compositions.

8. A method according to claim 1 wherein said method further comprises the step of determining whether a penalty should be assessed against said environmental score, wherein said penalty is based on the presence of any other pertinent environmental concerns, if any, and subtracting the penalty from said environmental score.

* * * * *